United States Patent
Ferrier née Pegot et al.

[11] Patent Number: 5,368,906
[45] Date of Patent: Nov. 29, 1994

[54] DEVICE FOR THE THERMIC PROTECTION OF THE INTERNAL WALL OF A HOLLOW STRUCTURE SUBJECTED TO AN ABLATIVE FLOW AND ITS PRODUCTION METHOD

[75] Inventors: Christiane Ferrier née Pegot, Igny; Jean-Marie Vernotte, Vanves, both of France

[73] Assignee: Aerospatiale Societe National Industrielle, Paris, France

[21] Appl. No.: 744,100

[22] Filed: Aug. 13, 1991

[30] Foreign Application Priority Data

Aug. 14, 1990 [FR] France ................. 90 10322

[51] Int. Cl.$^5$ ............... B65H 54/64; B32B 5/12
[52] U.S. Cl. ................... 428/34.5; 428/36.1; 428/266; 428/268; 428/375; 428/377; 428/902; 156/148; 156/170; 156/171; 156/172; 156/173; 66/9 A
[58] Field of Search ............ 156/173, 148, 166, 169, 156/170, 171, 172; 428/36.1, 36.3, 693, 698, 34.5, 266, 268, 375, 377, 902; 66/7, 9 A

[56] References Cited

U.S. PATENT DOCUMENTS

| | | | |
|---|---|---|---|
| 2,222,288 | 11/1940 | Ford | 66/7 |
| 3,201,954 | 8/1965 | Greczin | 66/9 A |
| 3,577,294 | 5/1971 | David | 156/173 |
| 3,904,464 | 9/1975 | King | 156/173 |
| 4,059,468 | 11/1977 | Bouillon | 428/102 |
| 4,080,915 | 3/1978 | Bompard et al. | 112/262.1 |
| 4,366,658 | 1/1983 | Maistre | 428/34.1 |
| 4,492,096 | 1/1985 | Cahuzac | 156/148 |
| 4,495,231 | 1/1985 | Laskaris et al. | 428/36.3 |
| 4,588,622 | 5/1986 | Sukarie | 428/36.3 |
| 4,655,866 | 4/1987 | Ferrier | 156/173 |
| 4,854,990 | 8/1989 | David | 156/173 |
| 4,863,660 | 9/1989 | Cahuzac et al. | 156/173 |
| 4,892,764 | 1/1990 | Drain et al. | 156/173 |
| 4,917,756 | 4/1990 | Cahuzac et al. | 156/173 |
| 5,151,145 | 9/1992 | Cederberg | 156/172 |

FOREIGN PATENT DOCUMENTS 0150566 8/1985 European Pat. Off. .

*Primary Examiner*—Ellis P. Robinson
*Assistant Examiner*—Rena L. Dye
*Attorney, Agent, or Firm*—Armstrong, Westerman, Hattori, McLeland & Naughton

[57] ABSTRACT

The thermic protection device is obtained by winding refractory wires with plush loops and radial and reinforcement armament picots, also with refractory fibers, preferably twisted. The plush loops and the picots have a predetermined orientation and/or pitch with respect to the direction of the ablative flow in the hollow structure.

Application for the embodiment of the ferrule of a ram jet engine chamber.

6 Claims, 1 Drawing Sheet

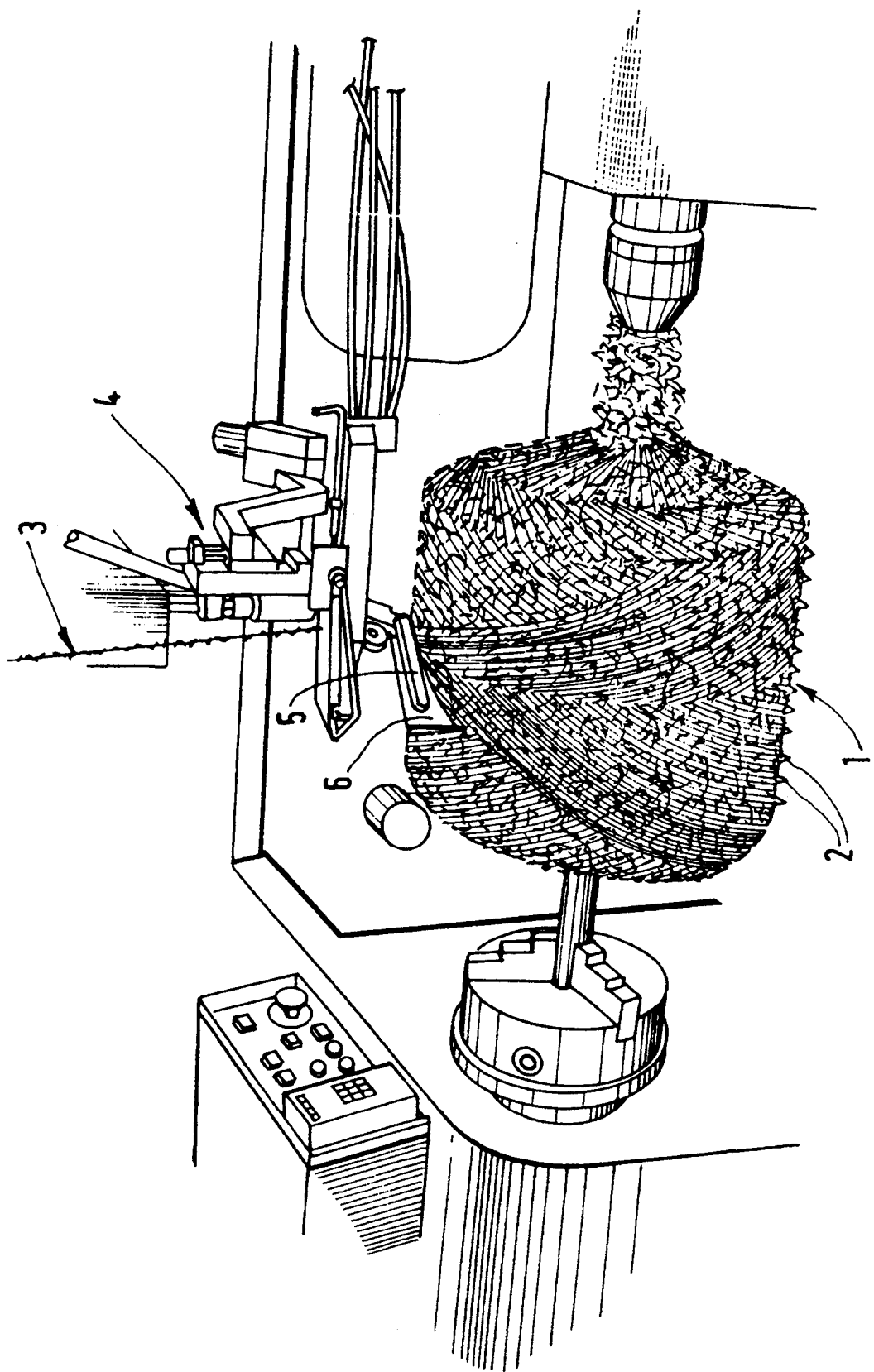

DEVICE FOR THE THERMIC PROTECTION OF THE INTERNAL WALL OF A HOLLOW STRUCTURE SUBJECTED TO AN ABLATIVE FLOW AND ITS PRODUCTION METHOD

FIELD OF THE INVENTION

The invention concerns a device for thermically protecting the internal wall of a hollow structure, such as the ferrule of a ram jet engine chamber subjected to an ablative flow of corrosive gases at a high speed and high temperature.

BACKGROUND OF THE INVENTION

In the current state of the prior art, the thermic protection films of such structures are constituted by composites with organic, organo-metallic or mineral binders able to include reinforcements made up of powders, fibers, organic tissues or minerals. Under the action of the hot gases, the ablatable material undergoes the pyrolysis phenomenon. This pyrolysis is accompanied by a degradation of the carbonated or organo-silica chain of the binder which renders the slag fragile and brittle inside the mass. So as to mitigate this fragility, the thermic protection layer is currently reinforced according to various techniques.

In fact, for an ablatable material of this type subjected to erosion by hot gases and to vibrations, it is known that ablation is reduced when the material is reinforced. The reinforcement embedded in the nonconducting material may be metallic, woven or fibrous.

The patent FR-A-2.569.237 describes such a reinforced thermic protection device and the corresponding production method for thermically protecting walls skirted by gas flow veins, such as ram jet engine chambers.

The advantage of this prior patent was to make it possible to embody a flexible protection film, possibly made of silicon, reinforced by a reinforcement orientated with respect to the flow of gases, which provides good resistance to ablation and tearings provoked by the vibrations due to the functioning of the engine.

So as to improve the mechanical behaviour of a structure after pyrolysis of the binder, it is necessary to reinforce the thermic protection so that after pyrolysis of the matrix for the entire thickness of said protection, the residual material obtained constitutes a nonconducting, non-fissured and non-crackable casing protecting the external structure whilst the engine is functioning.

One of the most advantageous ways to structure a matrix is to embody three-dimensional structurings by means winding the wire in a radial direction and depositing the wire longitudinally on a mandrel provided with picots. The matrix is normally brought by injecting non-charged liquid resin into the meshwork of the prepared structure.

However, this technique has the drawback of setting the diameter of the thermic protection since it uses circumferential wires unable to deform when pressurizing the chamber, especially initially when the accelerator integrated in the chamber is functioning, whereas the metallic structure shall deform, which will induce rupture of the thermic protection by these circumferential wires and risks rupturing the glued link.

SUMMARY OF THE INVENTION

Accordingly, the invention provides a thermic protection device glued to the structure, this solution having the advantage of being flexible and able to be extended, thus enabling it to follow the actual deformation of the structure when the chamber is pressurized.

One purpose of the present invention consists of a device for thermically protecting the internal wall of a hollow structure subjected to an ablative flow at a high temperature in the presence of vibrations and formed of a three-dimensional structure and a binder, said device being constituted by a fibrous armature obtained via the winding of refractory fibers or plush loop wires and radial armament and reinforcement picots, also made of refractory fibers, preferably twisted, the plush loops and the picots having an orientation and/or pitch predetermined with respect to the direction of the ablative flow in the hollow structure. The picots are placed on a mandrel along a spiral-formed trajectory providing helical chutes for winding the wire according to the sought-after angle and an implantation pitch determining the density of the radial reinforcements constituting said picots.

Advantageously, the wire is placed at the same time as an impregnation resin at the bottom of the helical chutes with the aid of a nozzle able to orientated in any direction and able to adjust guidance and tension of the wire, complementary wings for guiding and protecting the wire framing the nozzle and extending above the mandrel.

Another objective of the invention concerns a method for embodying a device for thermically protecting the internal wall of a hollow structure subjected to an ablative flow at a high temperature in the presence of vibrations, said method consisting of:

winding refractory fibers or plush loop wires on a mandrel at the bottom of helical chutes provided by picots spiral-placed on said mandrel, depositing an impregnation resin at the bottom of the chutes at the same time as placing of the wires, polymerizing the pre-impregnated unit under pressure at the temperature adapted to the resin system, and bringing the thermic protection obtained to the thickness desired by means of internal and external machining.

BRIEF DESCRIPTION OF THE DRAWINGS

The invention is now to be described with reference to the sole figure representing a perspective view of a device for winding a thermic protection. The figure shows a foam mandrel 1 on which small picots 2 are placed along a spiral-shaped trajectory providing helical chutes. The axial pitch of the spiral and the implantation pitch of the picots define for a given diameter the angle it is desired to have forwarded to winding of the armature and the density of the radial reinforcements constituting said picots.

DETAILED DESCRIPTION OF THE PREFERRED EMBODIMENTS

Fibers or plush loop wires 3 are placed on the picot mandrel with the aid of a winding machine 4 provided with a digital control able to observe the winding parameters imposed by the picots being implanted. The wire and the impregnation resin are both deposited by a heddle hook distributor constituted by an adjustable nozzle 5 able to pivot in any direction under the action of jacks (not shown). The nozzle distributes the wire in the sought-after direction, protection wings 6, disposed on each side and which frame said nozzle and projecting above the mandrel, having an additional function of guiding the wire inside the chutes delimited by the picot rows 2.

A known tension is applied to the wire so as to have the wire penetrate at the same time as the impregnation resin and ensure good compactness between the successive films. So as to further improve this compactness, the chutes are filled step by step depositing on the way there at least one half-film per millimeter, the other half-film being deposited during return of the winder.

The plush loop wire 3 constituting one of the basic elements of the structure has been carefully selected. It is made up of several tufts, the main tufts ensuring the mechanical behaviour of the wound tuft, the others constituting the loop. It contains at least one substance belonging to the group constituted by carbon, silica, silicon carbide, glass, aromatic polyamide fibers sold under the trademark Kevlar, aluminium or an aluminosilicate. The loops of the plush loop wires of two superimposed films may interlock and contribute in providing the structure with resistance to ablation, whilst playing the role of radial reinforcement. In order to meet these requirements, it is of interest to obtain the most suitable plush loop density.

Similarly, the diameter of the loops and the density of the wire in the loop have an effect on the aptitude of the wire for penetrating to the bottom of the chute constituted by the picots. Loops with a small diameter or too dense in the wire would prevent the successive films from being inserted into one another at the bottom of the chute.

The impregnation resin mentioned earlier is deposited under the wire in the form of a continuous strip. Its composition is adjusted so that the mixture is sufficiently thixotropic so as to stop it from flowing. Furthermore, its period of life in a pot needs to be adjusted so as to be able to embody the device. The binder is an organic or semiorganic or mineral duroplastic resin, such as a phenylic, furannic, polyimide, polystyripyridine, silicon or silicate resin. It may also be charged with a substance, such as a silicon carbide, silica or silicon nitride powder.

As regards the picots which are the other main constituents of the new sought-after protection, they form a radial armature advantageously constituted by fibers of phenolic impregnated silicon carbides and complete the armament and reinforcement of the structure. Preferably, the density of the picots is at least 7 picots per $cm^2$. They may also contain a substance from a given group containing those specified for the plush loop wire. The twisting of the fibers moreover improves the effectiveness of the picots.

Finally, after winding, the device is polymerized under pressure and after polymerization, the thermic protection obtained is brought back to the desired thickness by means of internal and external machining.

This method of use guarantees obtaining a thermic protection structured in three dimensions and retaining its extension possibilities by virtue of the winding angle and having improved resistance to ablation by virtue of using a specially elaborated plush loop wire.

So as to illustrate a protection device conforming to the invention, there now follows one first embodiment example:

The winding is effected on a mandrel with a diameter of 100 mm,

The pitch of the picots is circumferentially 2.5 mm and axially 5 mm, which represents a density of 7.37 picots/cm2, The wire used has 160 plush loops per meter with a diameter of 4 mm. It is made up of a core tuft of 500 wires, a plush loop of 500 strands and a linking wire of 250 strands. The tension applied is 1.5 kg for a mean winding angle of 45 degrees.

According to a second embodiment example:

The winding is effected on a mandrel with a diameter of 330 mm,

The pitch of the picots is such that their density is 7.24 picots/$cm^2$,

The wire used is made up of two core tufts with 500 filaments, one plush loop wire with 250 filaments and a linking wire with 250 filaments. The number of plush loops per meter is 160. The diameter of the plush loops is 8 mm. The tension applied is 5 kg for a mean winding angle of 60 degrees.

For both these examples, a thermic protection is obtained after polymerization and machining and provides good results in the ablation and vibration resistance tests.

Thus, the protection obtained is adapted to resist a temperature of 2000° C. in an oxidizing environment for at least 30 minutes. It may also resist high frequency vibrations of between about 1000 and 2500 Hertz for several tens of minutes. Finally, so as to obtain good results, it shall be observed that the structuring percentage shall reach at least 20% in weight of the device.

What is claimed is:

1. A device for thermically protecting the internal wall of a hollow structure subjected to an ablative flow at a high temperature in the presence of vibrations, said device comprising a three-dimensional structure and a binder, said three-dimensional structure comprising a fibrous wound armature of reinforcement picots of refractory fibers and refractory wires having plush loops, the reinforcement picots extending radially in the three-dimensional structure and in a spirally wound form with spaces between adjacent reinforcement picots which define helical chutes, the reinforcement picots having one or more of orientation and pitch determined with respect to the direction of the ablative flow in the hollow structure, and the refractory wires being in the helical chutes to provide said armature.

2. A device according to claim 1, wherein complementary wings for protecting and guiding the wire placed at the same time as the impregnation resin at the bottom of the helical chutes form a nozzle capable of being orientated in any direction and extending above the mandrel.

3. A device according to claim 1, wherein the wires having plush loops and the picots contain at least one substance selected from the group consisting of carbon, silica, silicon carbide, glass, aromatic polyamide fibers, aluminum and an alumino-silicate.

4. A device according to claim 1, wherein the binder contains at least one substance selected from the group consisting of silicon carbide powder, silicon nitride powder, silicon carbide fiber, carbon fiber and silica fiber.

5. A device according to claim 1, wherein the picots are constituted by phenolic impregnated silicon carbide fibers.

6. A device according to claim 1, wherein the density of the picots is at least 7 picots per $cm^2$.

* * * * *